United States Patent
Fennema et al.

(10) Patent No.: US 6,898,038 B1
(45) Date of Patent: May 24, 2005

(54) METHOD AND APPARATUS FOR DISC DRIVE DATA SECURITY USING FIELDS IN SERVO WEDGES

(75) Inventors: Alan A. Fennema, San Jose, CA (US); Gayle L. Noble, Boulder Creek, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 466 days.

(21) Appl. No.: 09/809,700

(22) Filed: Mar. 15, 2001

Related U.S. Application Data

(60) Provisional application No. 60/189,360, filed on Mar. 15, 2000.

(51) Int. Cl.$^7$ .............................. G11B 5/02; H04K 1/00
(52) U.S. Cl. .............................. 360/60; 360/15; 360/55; 360/69; 380/201; 380/203; 380/28
(58) Field of Search .............................. 360/60, 69, 15, 360/55; 380/203, 28, 201

(56) References Cited

U.S. PATENT DOCUMENTS

| | | | | |
|---|---|---|---|---|
| 5,268,960 A | * | 12/1993 | Hung et al. ................. | 713/200 |
| 5,315,448 A | * | 5/1994 | Ryan ........................... | 360/60 |
| 5,418,852 A | * | 5/1995 | Itami et al. .................. | 705/57 |
| 5,418,853 A | * | 5/1995 | Kanota et al. .............. | 380/203 |
| 5,574,787 A | * | 11/1996 | Ryan ........................... | 380/201 |
| 5,659,613 A | * | 8/1997 | Copeland et al. ........... | 380/202 |
| 5,828,754 A | * | 10/1998 | Hogan ......................... | 341/69 |
| 6,052,780 A | * | 4/2000 | Glover ........................ | 713/193 |
| RE37,052 E | * | 2/2001 | Park ............................ | 380/203 |
| 6,236,727 B1 | * | 5/2001 | Ciacelli et al. .............. | 380/212 |

* cited by examiner

*Primary Examiner*—David Hudspeth
*Assistant Examiner*—Natalia Figueroa
(74) *Attorney, Agent, or Firm*—Moser Patterson & Sheridan

(57) ABSTRACT

The present invention includes a method and apparatus to write and read copy protected data on a disc drive storage system by encoding and decoding data to be copy protected using servo wedge data as the encoding element. In one aspect, the drive is marked by a number generated from the servo wedge data.

25 Claims, 10 Drawing Sheets

METHOD AND APPARATUS FOR DISC DRIVE DATA SECURITY USING FIELDS IN SERVO WEDGES

CROSS-REFERENCE TO A RELATED APPLICATION

This invention is based on U.S. Provisional Patent Application Serial No. 60/189360 filed Mar. 15, 2000, entitled Data and copy Protection on Disk Drives Based On fields in Servo Wedges filed in the name of Alan A. Fennema and Gayle L. Noble. The priority of this provisional application is hereby claimed.

BACKGROUND OF THE INVENTION

1. Field of the Invention

The present invention generally relates to storing and retrieving copy-protected data on a disc drive.

2. Background of the Related Art

With the advent of the recording and playing of digital data, the need to store copy-protected data on disc drives becomes increasingly a necessity. Digital data is rapidly becoming the standard format by which industries, such as the entertainment industry, record and play multimedia. Paid for programming available to the public such as movies, sound tracks, music recordings, and the like, are increasing in demand. With digital recording, the public has more options than ever to listen to and/or record digital audio and video with unparalleled recording and playback quality.

One exemplary storage system being used more frequently to store digital multi-media is a computer controlled disc-based storage drive, e.g., a disc drive. Disc drives are capable of storing large amounts of digital data in a relatively small area. Disc drives store information on one or more recording media. The recording media conventionally take the form of a circular storage disc, e.g., media, having a plurality of recording tracks. Conventional disc drives include a plurality of the storage discs, vertically aligned, and each with at least on magnetic head for reading or writing information to the media. Typically, the magnetic head is attached to a positioner arm assembly that uses servomotors, such as stepper motors, to align the magnetic head above the disc. The location of the magnetic head is typically determined by a disc controller that is given the position of a data area on the disc to read or write data. The precise location of the head is typically accomplished by incorporating a closed-loop electro-mechanical servo system with a dedicated servo region, or regions, used to provide relatively continuous feedback to the system to maintain accurate positioning of the data heads.

Unfortunately, due to the high quality of the data and the fact that the data stored on digital storage systems, such as disc drives, is often unprotected and easily copied, the copying and selling of unauthorized copies of digitally recorded material is on the rise. Consider the case where a paid for program such as an audio file is downloaded via a network of computers such as the Internet, to a disc drive for play by a client who has paid for the file. Often, the file may be copied to another storage media or to another disc drive for use by another user unless copy protection is used. This often referred to as "pirating" a copy of the file. Additionally, the file may be repackaged and sold by others for profit without permission, often called "software piracy". In addition, the files may be shared by other users by playing from the owner's computer allowing the end user the benefit of the file without purchasing the file from the owner.

Conventional digital copy-protection schemes involve techniques such as registration, encryption, digital watermarking, 5C content, and the like. For example, software copy protection schemes often involve the use of copy-protection techniques that require issuing registration numbers with each package. When you install the software, you must enter the registration number. This technique does not prevent all unauthorized copying, but it limits it. In addition, users may not be able to obtain updates to a software product unless they own the original diskettes and documentation. Unfortunately, the user may forget, or may have difficulty in registering the software and may become frustrated if the software stops working and/or working properly.

For conventional multimedia, data stored on optical surfaces such as found on a digital versatile disc (DVD) is often copy protected. For example, the digital-video format includes a content scrambling system (CSS) to prevent users from copying discs. The DVD system may also use key based techniques such as the 5C technique that has software keys that expire after use. Unfortunately, this means that today's DVD players may not be able to play DVD-video discs without a software and/or hardware upgrade to decode the encrypted and/or keyed data even though the use may be authorized.

Another issue with conventional copy protection is that of making backups of the data. For example, a user may have a computer that they need to backup the data, conventional encryption techniques often require that a hardware and/or specific software key(s) be used before the data can be successfully copied. Unfortunately, the user may not have the correct hardware or software key to allow the transfer of the data and may become frustrated.

Furthermore, most conventional copy protection techniques such as CSS are defeated over time causing the digital-video and software industry to constantly upgrade the hardware, and/or software techniques to combat the unauthorized copying. The constant upgrading and development of protection techniques that are eventually exposed and defeated causes an increase in the cost of the product as well as possible incompatibility issues with existing systems.

Thus, what is needed is a method that allows the recording and playing of copy protected material to the user without the ability to copy the data or use the data in an unauthorized manner without affecting the compatibility of the storage device to operate with non-copy protected data.

SUMMARY OF THE INVENTION

The invention generally provides a method and apparatus for storing and retrieving copy protected data within storage devices such as a disc drive. In one embodiment, the invention provides a method of writing and reading on a disc drive data to be copy protected including, for a write sequence providing data to be copy protected, then determining if a request to write copy protected data has been issued, if a request to write copy protected data has been issued then providing an encoding element, then encoding the data using the encoding element, writing the encoded data to the media, if the request to write copy protected data has not been issued then writing the data, whereas for a read sequence determining if a request to read copy protected data has been issued, if the request to read copy protected data has not been issued then reading the data from the media, if the request to read copy protected data has been issued then providing a decoding element, wherein the decoding element is derived from the encoding element, and decoding and reading the data wherein the encoding element comprises servo wedge data.

In another embodiment, the invention provides a method of writing and reading on a disc drive data to be copy protected including, for a write sequence, providing data to be copy protected, determining if a request to write copy protected data has been issued, if a request to write copy protected data has been issued then, providing at least a first drive mark, storing the first drive mark to a media and writing the data, if the request to write copy protected data has not been issued then writing the data, and for a read sequence, determining if a request to read copy protected data has been issued;

if the request to read copy protected data has not been issued then reading the data from the media;

if the request to read copy protected data has been issued then reading the first drive mark, establishing at least one comparison drive mark, comparing the first drive mark to the comparison drive mark, and reading the data.

In one embodiment, the invention provides a signal-bearing media means for storing data, a code memory means coupled to a read/write controller means for controlling the reading and writing of data to the signal-bearing media, means for reading and writing the data to the signal-bearing media, a processor means coupled to the code memory and the read/write controller for reading and writing copy protected data on the signal-bearing media means.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Embodiments of the invention have particular advantages in electronic data storage systems. One exemplary electronic data storage system commonly used in the computer industry, well suited for supporting the digital data copy protection method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
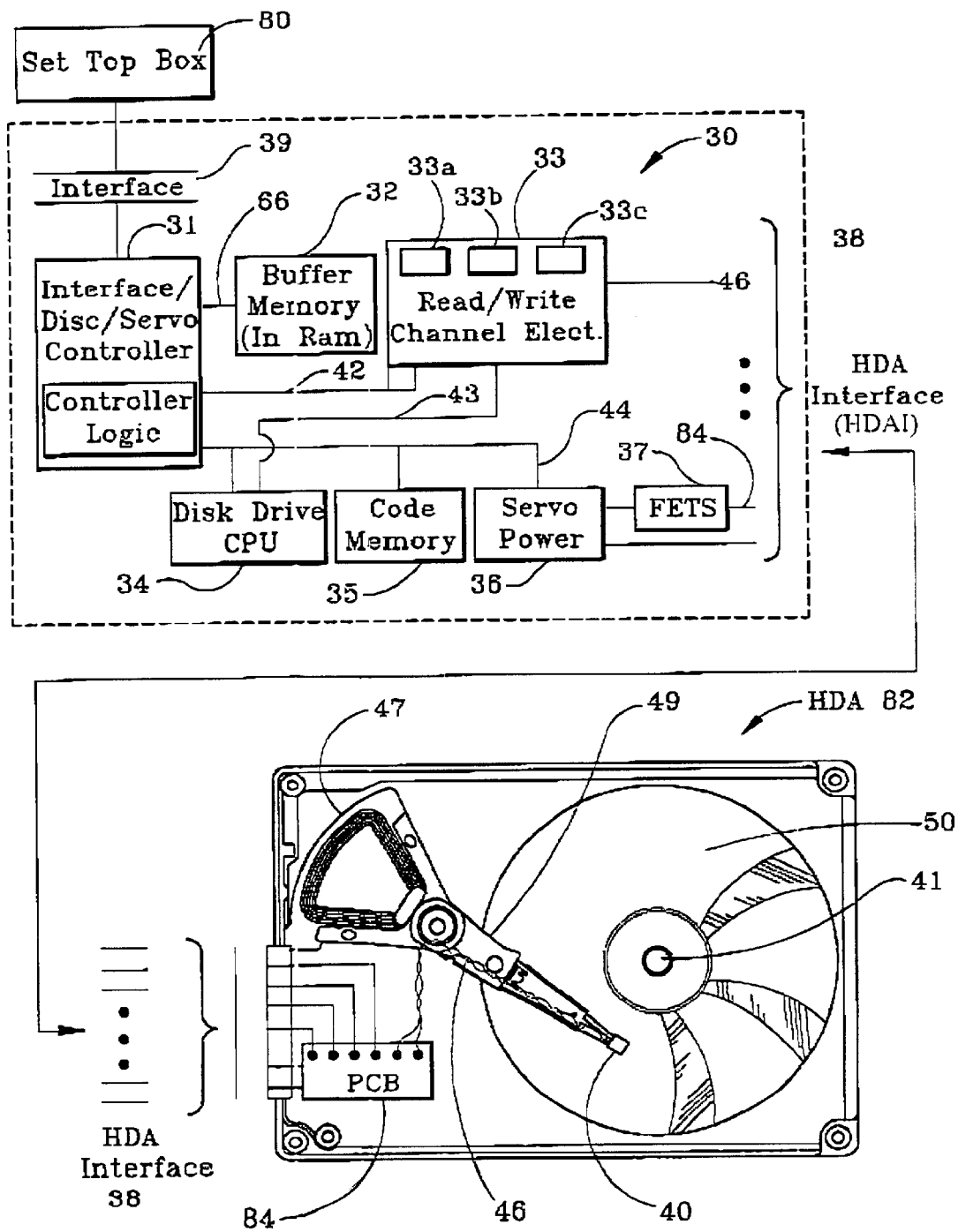
FIG. 1 is a plan view of a typical disc-based apparatus for reading and writing data on a media wherein the present invention may be used to advantage.

FIG. 1 is a plan view of a typical disc-based apparatus for reading and writing data on a media wherein the present invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above a media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information. The set top box 80, coupled to interface 39, is used to communicate with video and audio sources such as digital cable TV systems, digital satellite, and the like and is adapted to handshake with the disc drive electronics 30 so as to control the inflow/outflow and protection of copy protected data. The step top box 80 is of any conventional design adapted to receive digital information and transmit the information to the interface, and communicate with the disc drive electronics 30 through interface 39 to interface/disc/servo controller 31. The set top box 80 may communicate with the interface through any conventional communication mode such as SCSI, ATA, serial, IEEE 488, and any other form of electronic data transfer. Illustrative multimedia formats include audio files (e.g., AU, WAV, AIFF, MIDI, MP3), video files (e.g., MPEG, AVI), image files (GIF, JPEG, XBM, TIFF, PICT, Raster file) and other formats known in the art.

The interface/disc/servo controller 31 provides a translation and command interface between the set top box 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to CPU 34 used for processing the disc drive commands, the code memory 35 is adapted to store operational data and commands, and the servo power electronics 36 are adapted to operate the servomotor 41 and actuator arm 49. Servo power electronics 36 are typically connected to the HD 82 via servo control connection 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 via data bus 42 include read write logic 33a, write logic 33b, and servo logic 33c, and includes a connection to the interface/disc/servo controller 31 through data bus 42. A serial bus 43 is used to send configuration commands from the CPU 34 to the read/write channel electronics 33.

FIG. 1 is merely one hardware configuration for a disc-drive data storage system. A preferred embodiment of the present invention can apply to any comparable hardware configuration, regardless of whether the disc-drive data storage apparatus is a complicated, multi-media storage apparatus including a plurality of media types, or a single disc-drive data storage apparatus.

Figure 2:
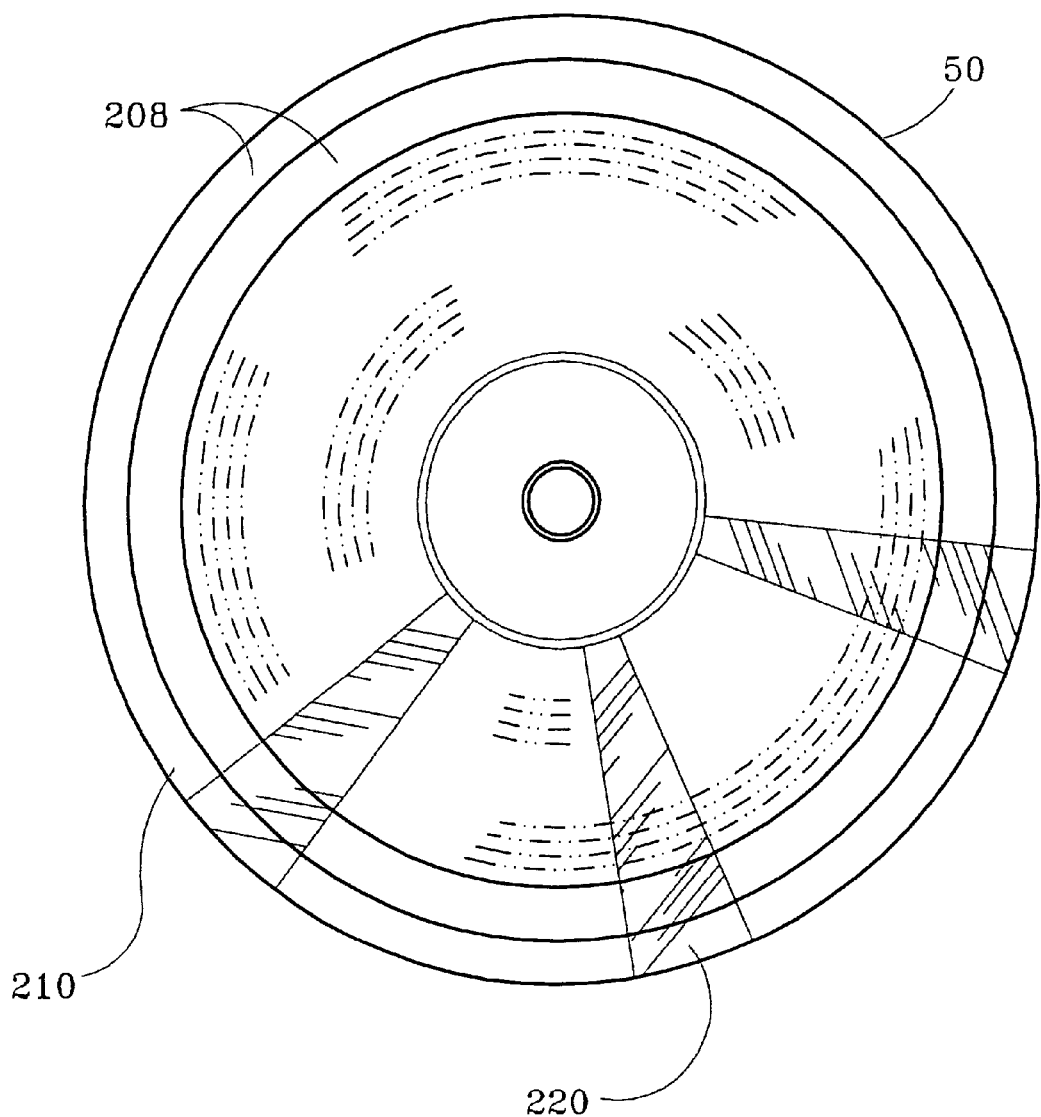
FIG. 2 is a plan view of typical media for storing data wherein the present invention may be used to advantage.

FIG. 2 is a plan view of the media 50 for storing data wherein the present invention may be used to advantage. FIG. 2 illustrates exemplary data storage tracks 208 on the media 50 including data wedges 210 separated by a plurality of servo wedges 220 in accordance to the present invention. As necessary, FIG. 1 is referenced in the following discussion of FIG. 2. For clarity, only portions of the tracks 208 are shown. Illustratively, a plurality of concentric tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user. The servo wedge 220 includes digital data that identifies the particular track (e.g., cylinder) and the sector. The servo wedge also includes area(s) of precisely placed magnetic bursts where the relative amplitude when read from the read/write head(s) 40, indicates the position of the head relative to the track center. Additional fields may be written into the servo wedge 220 as desired by the manufacturer. For example, some drives have information on the known area with which the position burst were written. During the manufacture, the drive measures the forces applied to the actuator 47 to keep the read/write head(s) 40 on track. A perfectly circular track would require no variation in head position and therefore no additional force, or variation of force, to keep the read/write head(s) 40 on track. The non-circularity of the track requires that the read/write head(s) be moved and can be written to describe a more circular track. This is known as zero acceleration profile (ZAP) number field. The probability of two media 50 having identical ZAP number fields is virtually impossible as the ZAP number field will vary as a function of the circularity of the track, the hardware, drive environment conditions during manufacture, and the like. In one aspect, during operation, the ZAP information may be changed as necessary to accommodate changes to the acceleration profile and thus keep the read/write head(s) 40 aligned. Each ZAP number field represent about four sectors of data in an adjacent data wedge 210. In one aspect, at least one byte of the ZAP number field is used to store a defined variable to mark the drive. For example if the ZAP number field is thirty bytes, then one byte is used for the variable byte as a ZAP field drive mark. In one aspect, the ZAP drive mark is generated by using the encoder 328, and/or any other variable generator adapted to output at least one variable byte. In another aspect, the ZAP number filed is fixed at the factory but other positioning indicia within the servo wedge data are used to help maintain the position of the head(s) 40 above each sector.

Figure 3:
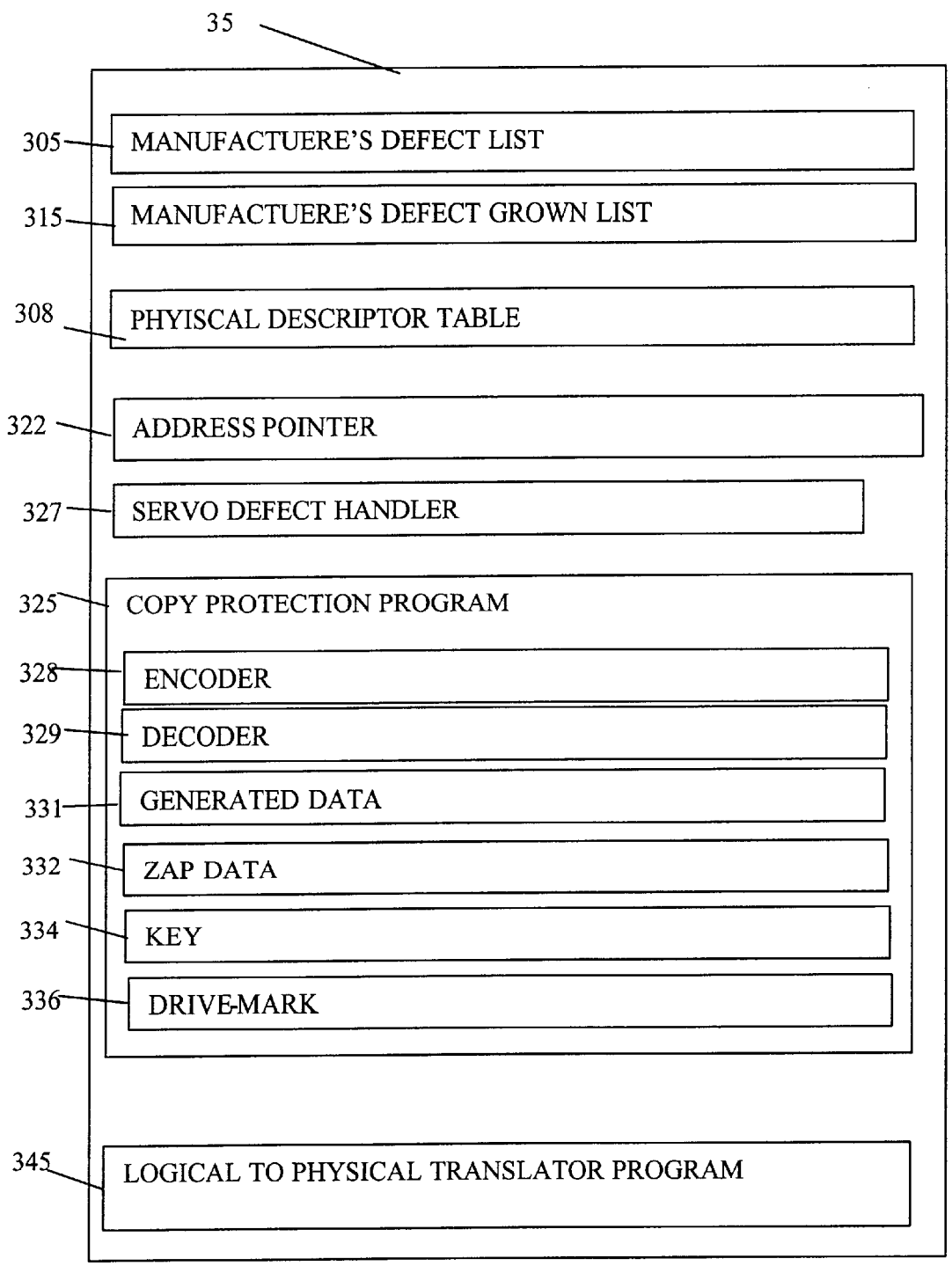
FIG. 3 illustrates a memory core for storing programming data in which the present invention may be used to advantage.

FIG. 3 illustrates the code memory 35 for storing programming data in which the present invention may be used to advantage. The code memory 35 is preferably random access memory sufficiently large to hold the necessary programming and data structures of the invention. The code memory 35 may be used to store operating code, and other run-time code that enables the drive. The contents of the code memory 35 may also be stored to a plurality of reserved areas of the media 50 or into other areas of the drive electronics 30 such as buffer memory 32 for redundancy.

The code memory 35 further includes a logical to physical translation program 345 adapted to transform logical block addresses (LBA) to physical media coordinates. Data communicated to and from a data storage system is normally managed by the LBA rather than by physical address. Data sectors are numbered blocks of data to be stored and retrieved. Data sectors are the fundamental units of data handled by the data storage system and are usually of fixed length, e.g., 512 bytes. In one aspect of the invention, one data sector equals the length of one data wedge 210. However, if the data wedges 210 are large, as is often the case with magnetic storage systems, several logical addressed data sectors may be stored in a single physical data wedge 210. The physical translation program 345 coordinates the translation of the logical address of a particular block of data to the physical address of the location at which the data is stored.

During manufacture, the recording media 50 is usually written to and then read back from to determine which physical addresses are defective. As part of the process of converting a logical block address to a physical location on the media 50 two lists are stored in code memory 35, a manufacturer's defect list 305 and a physical descriptor table 308. The physical descriptor table 308 generally includes servo data that indicates how many bytes of data may be written between each servo wedge 220 and may indicate if the servo wedge 220 is to be skipped. Additionally, the physical descriptor tables 305 may indicate that a zone needs to be skipped as there may be a very large defect in the media 50 covering more than one data wedge 210 within a zone. To skip a zone, the descriptor table "folds a wedge out" by skipping all of the data sectors within a zone. The manufacture's defect list 305, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation and physically damaging a data sector on the media 50. Media defects subsequent to the manufacturer's defect list 305 are placed in the manufacturer's defect grown list 315. Thus, the manufacturer's defect grown list 315 literally "grows" as the media 50 is used. The logical to physical translator program 345 uses the physical descriptor table 308, the manufacturer's defect list 305, and manufacturer's defect grown list 315 to determine if the requested sector(s) have moved due to defects during a read or write sequence. The code memory 35 also includes an address pointer 322 used to point the logical to physical translation program 345 to the physical descriptor table 308. The code memory 35 further includes a servo defect handler code 327 for defect management. The servo defect handler code 327 is used to manage defective servo wedges 220, and instructing the address pointer 322 to point to the physical descriptor table 308 to skip the defective servo wedges 220.

During a read operation, the read/write head(s) are constantly being monitored by the controller 31 and CPU 42 to determine the position of the read/write head(s) 40. Conventionally, the ZAP number field is used to set the correct track position and then the position burst fields are used as data to maintain the accuracy read/write head(s) 40. The memory 35 includes the ZAP number data structure 332 to store the ZAP number data. In one aspect, the ZAP number data structure 332 includes the ZAP field drive mark.

The code memory 35 further includes the copy protection program 325 used to allow the reading and writing of copy-protected data. In one embodiment, the copy protection program 325 generally includes encoding 328 and decoding programs 329. Encoding generally refers to the technique of altering data using techniques such as data summing, data replacement, and the like. The encoding program 328 generally uses a "seed" data, such as the ZAP number field logical block address, sector, data wedge location 210, and the like, to start a randomizing and/or scrambling process. The encoding program is used to encode and replace the data to be copy protected using generated data 331. In one aspect, data to be copied is processed by the copy protection program 325 and is encoded on the drive media 50 using an encoding element, such as the ZAP field within the servo wedge 220 of the data, as the "seed" element for the encoding process. Thus, in one aspect, the data that is copy protected is converted to randomized data, stored as generated data 331, and then is written to the media 50 at the location used for the seeding process. This is often referred to as "keying" the data where the key is the ZAP field data. In one aspect, the key is kept within memory 35 under key data structure 334. The copy protection program 325 comprises a decoder element 329 used to "decode" the copy-protected data. Generally, The same seed data i.e., key, is used to unlock the copy-protected data and to bring it back to original form. For example, if the copy-protected data was combined with data from the generated data 331, providing the original seed data may allow access to the generated data 331 thereby allowing the encoding process to be reversed.

The memory 35 also includes a drive mark element 336. In one aspect, the drive mark is a generated number generated by the encoding program 328. The drive mark is a derived from the ZAP field data and the encoding program 328 and stored in the drive mark data structure 336. The drive mark is generally also written to the media 50 in a reserved area such as either within a servo wedge 220 or data wedge 210. This "fingerprints" the media 50 with the drive mark. In addition, the drive mark may be located on the media 50 at an encoded location. For example, the ZAP number field is used to encode both the address location of the drive mark, as well as the drive mark. Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
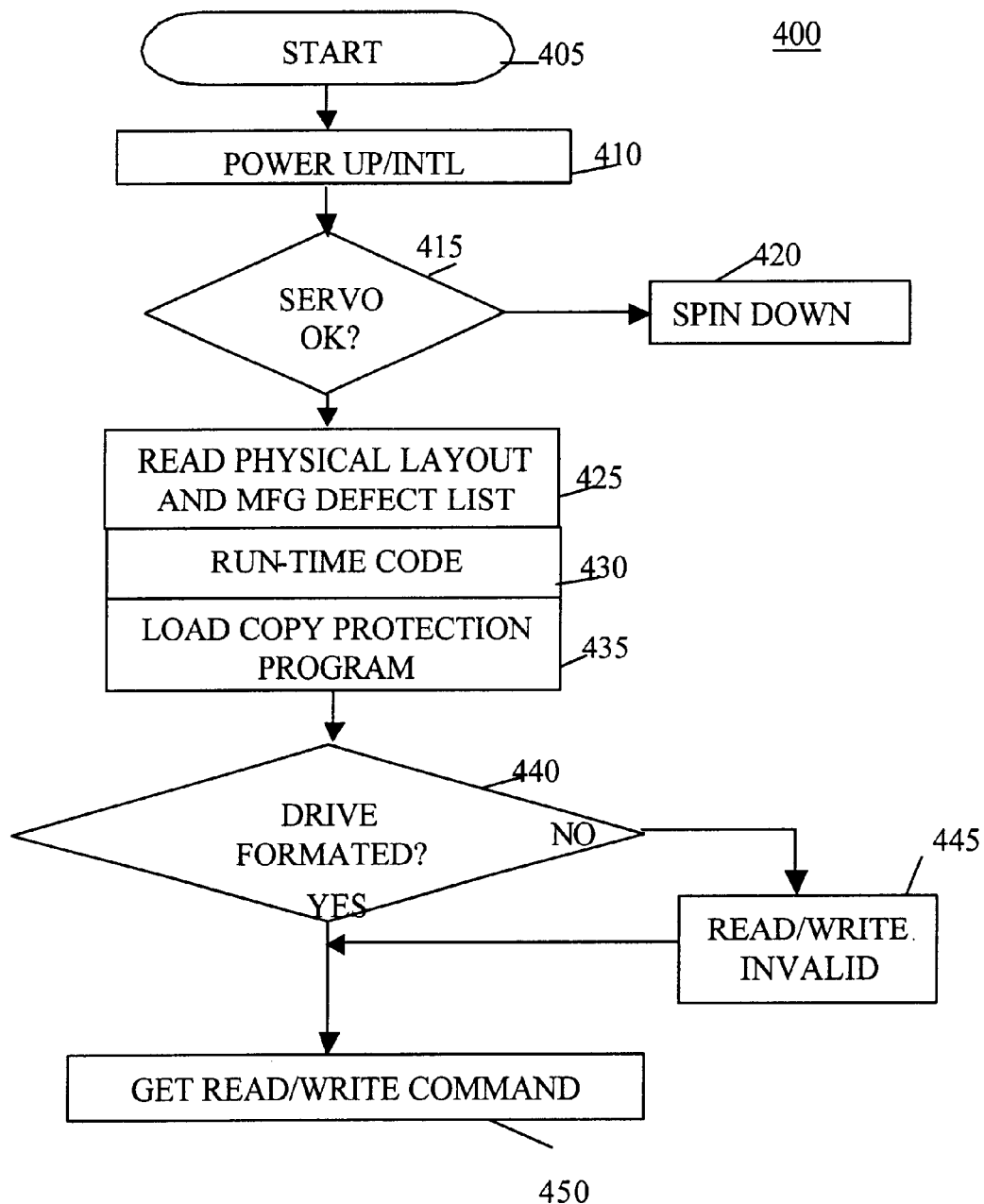
FIG. 4 is a flow diagram of a method for a start-up sequence for the disc-based apparatus of FIG. 1 in accordance with the present invention.

FIG. 4 is a flow diagram of a method 400 for a start-up sequence for the disc-based apparatus of FIG. 1 in accordance with the present invention. As necessary, FIGS. 1–3 are referenced in the following discussion of FIG. 4.

FIG. 4 is entered at step 405 when for example the set top box 80 instructs the disc drive electronics 30 to read or write data to the media 50. At step 410, the interface/disc/servo controller 31 initializes the disc drive electronics 30, CPU 32, the code memory 35, the servo power 36, FETs 37, the read/write channel electronics 33, and the buffer memory 32 and begins the process of "spinning", i.e., rotating, the media 50 up to prepare the media 50 for a read or write operation. At step 415, the method 400 determines whether the servomotor 41 is functioning properly. If the servomotor 41 is working improperly, the drive spins the servomotor 41 down method 400 at step 420. If the servomotor 41 is functioning properly, at 425 the actuator arm 49 positions the read/write transducer head(s) 40 and reads the manufacturer's defect list 305 and physical descriptor table 308 stored within a reserved area within memory and/or on the drive media such as a reserved area on a servo wedge 220. At step 430, run-time code such as the address pointer 322 is loaded into the code memory 35 from the media 50 and/or memory into a separate data location to allow the normal operation of the drive. At step 435, the copy protection program 325 is loaded into code memory 35 from the media 50 and/or memory. At step 440, the media 50 is checked if it is properly formatted to receive data from the read/write transducer head(s) 40. If the media 50 is not properly formatted, then at 445, the read/write commands are set as invalid and then the method 400 proceeds to step 450. If the read/write commands at step 450 where set to invalid from step 445, then the drive would be unable to be used for storing or retrieving data from the data wedges 210. If the read/write commands are set to valid, the method 400 waits for a read or write command.

Figure 5:
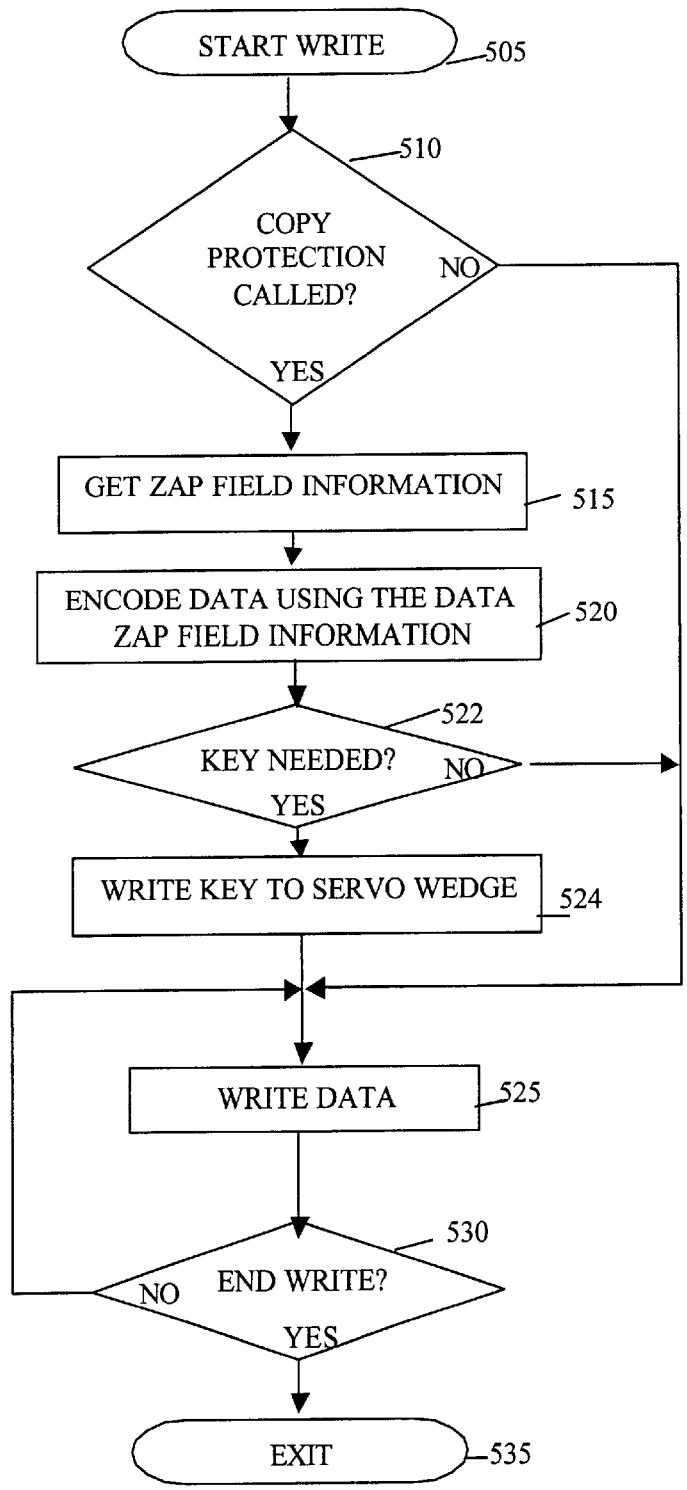
FIG. 5 is a flow diagram of a method of encoding copy protected data using servo wedge data and writing the copy protection data on a disc-based apparatus of FIG. 1 in accordance with the present invention.

FIG. 5 is a flow diagram of a method 500 for a method of writing data on the media 50 of FIGS. 1 and 2 in accordance with the present invention. As necessary, FIGS. 1–4 are referenced in the following discussion of FIG. 5.

FIG. 5 is entered at step 505 when a write command is received at step 450. At step 510, the read/write head(s) 40 are positioned by actuator arm 49 in response to interface/disc/servo controller 31 and data is written onto the media 50. At step 510, method 500 determines whether a copy protection command via interface 39 called the copy protection program 325. In one aspect, the set top box 80 issues the copy protection command to the interface/disc/servo controller 31 although the command may be issued from any authorized user of the data. If the command for copy protection was not received and/or not understood, the method 500 proceeds to step 525. If the copy protection program 325 was called, the method 500 proceeds to step 515 and gets the ZAP number field data from the media 50 and/or memory. At step 520, the data is encoded using the encoder 328 and the ZAP number field data as the seed data copy protection program 325 into the generated data 331. At step 522, a check is made to see if the key from key data structure 334 is required. If the key was required then the key is obtained and written to a servo wedge at step 524. Subsequently, method 500 proceeds to step 525. At step 525, the encoded data from the generated data 331 is written to the media 50. In one embodiment, only some of the copy protected data is encoded to increase the processing time and/or minimize the size of the generated data 331. At step 530, method 500 determines if the write sequence has ended. If the sequence has ended, method 500 exits at step 535. If the write sequence has not ended, then method 500 returns to step 525 and continues the write sequence. Thus, if the copy protection program 325 was not called, the data may be normally written, and if the data protection program 325 was called, the data is encoded and then written.

Figure 6:
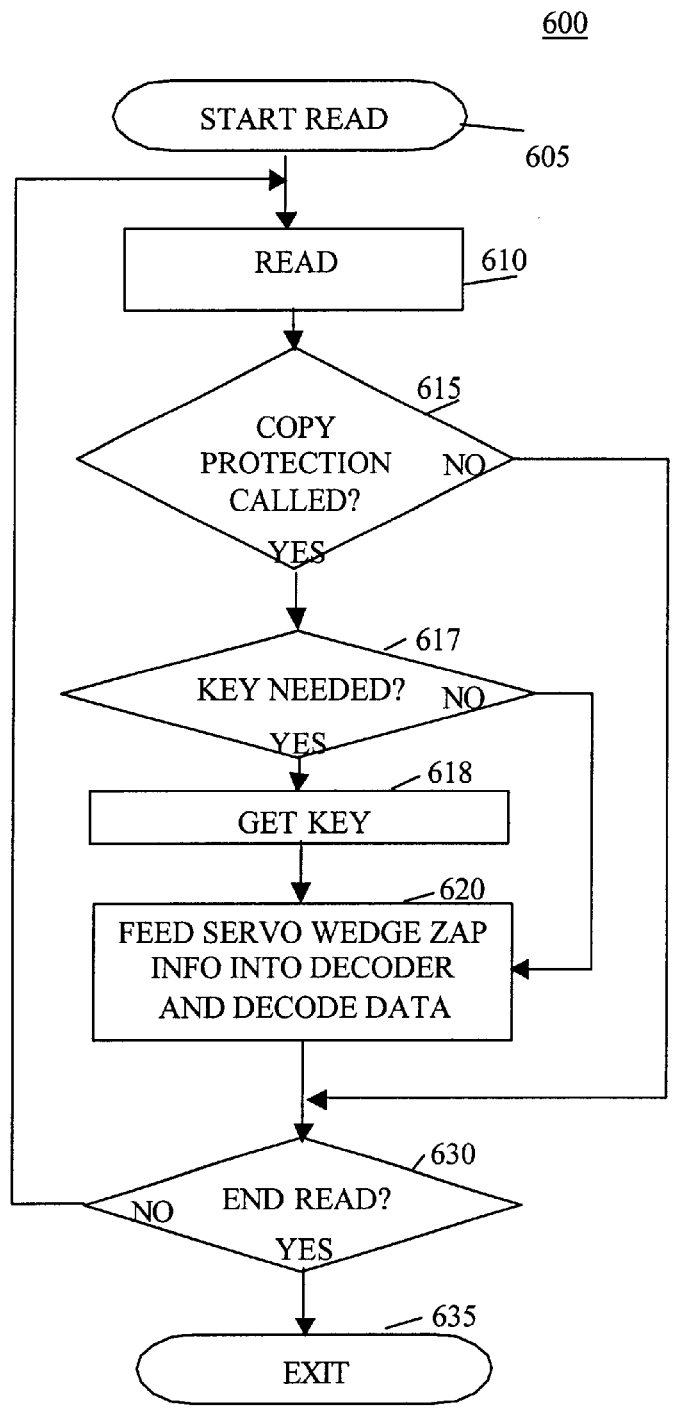
FIG. 6 is a flow diagram of a method of decoding data using servo wedge data and reading the data from the disc-based apparatus of FIG. 1 in accordance with the present invention.

FIG. 6 is a flow diagram of a method 600 for a method of reading data from the media 50 of FIGS. 1 and 2 in accordance with the present invention. As necessary, FIGS. 1–5 are referenced in the following discussion of FIG. 6.

FIG. 6 is entered at step 605 when a read command is received at step 450. At step 610, method 600 converts the logical addresses to physical address using the logical to physical address translation program 345 and then reads the data. At step 615, method 600 determines if the copy protection program 325 was called. If the copy protection program 325 was not called then method 600 proceeds to step 630. If the copy protection program 325 was called, then at step 617 a check is made to see if the key from key data structure 334 is required. If the key was required then the key is obtained at step 618. At step 620, the ZAP number field data 332 and if required, the key data 334, are fed into the decoder 329 to decode the data. If the data being read was written as copy protected from method 500 and the copy protection program 325 was called, then the data reads normally as the encoding/decoding information is available. From step 620, if the data being read was written as copy protected from method 500, and the copy protection program 325 was not called, then the encoded data is read without decoding. At step 630, method 600 determines if the read sequence has ended. If the read sequence has ended, the method 600 proceeds to step 635 and exits. If the read sequence has not ended, the method 600 proceeds to step 610 and continues to read the data. Thus, an unauthorized user would not be able to read the data from the disc drive as the copy protected data is encoded. In the case of internal drive reallocation, the copy protection module decodes and then re-encodes the data that has moved using the same ZAP data and/or key data 334 as required.

Figure 7:
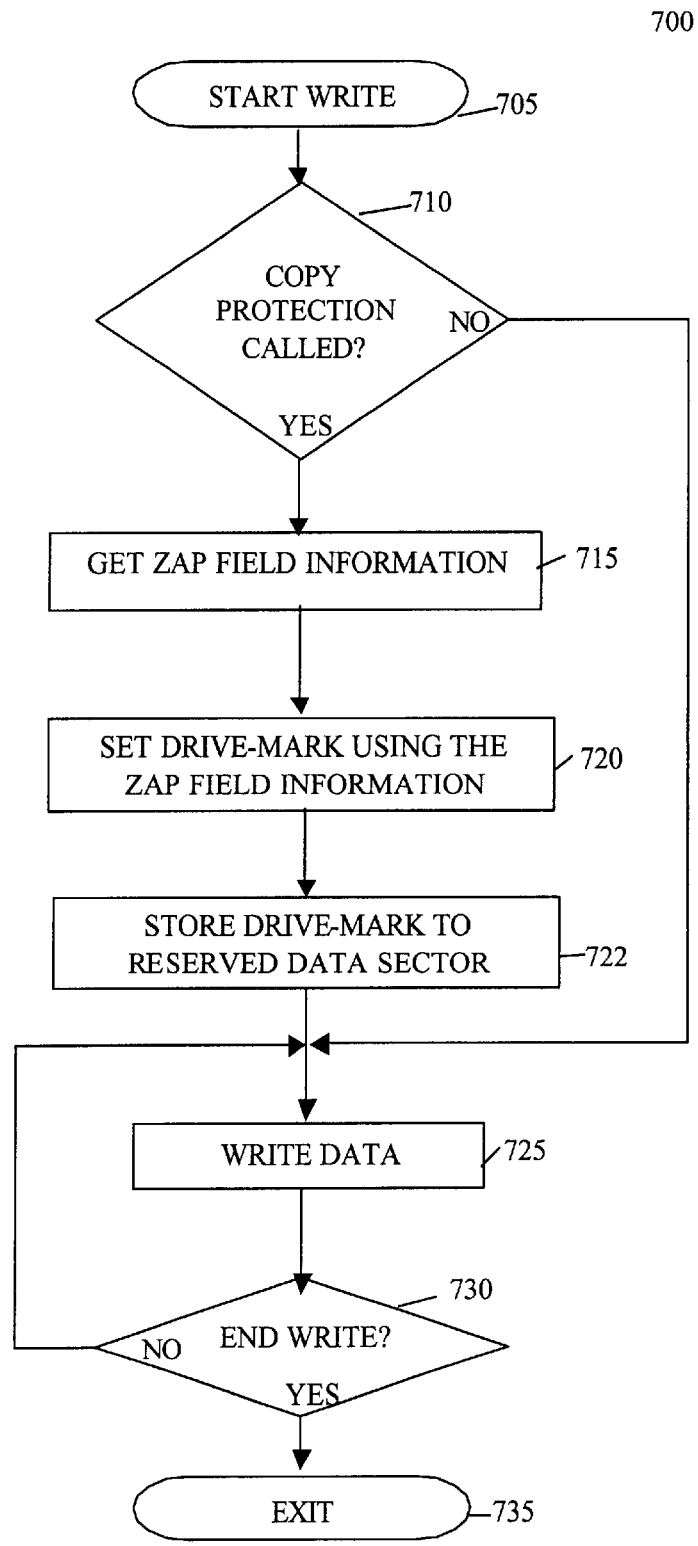
FIG. 7 is a flow diagram of a method of marking a disc drive media using servo wedge data in accordance with the present invention.

FIG. 7 is a flow diagram of a method of marking a disc drive media using servo wedge data in accordance with the present invention. As necessary, FIGS. 1–6 are referenced in the following discussion of FIG. 7.

FIG. 7 is entered at step 705 when a write command is received at step 450. The method 700 determines if the copy protection program was called. If the copy protection program 325 was not called then method 700 proceeds to step 725 to write the data to the media 50. In one aspect, if the copy protection program 325 was called, then at step 715 the ZAP number field information is obtained from ZAP data structure 332. At step 720, method 700 generates the drive mark from the ZAP number field using any variable generation, such as randomized, constant, numerical, alpha-numerical, and the like. In one aspect, the encoder 328 is used to generate the drive mark. At step 722, the drive mark is stored to a reserved sector within the servo wedge(s) 220 and/or data wedge(s) 210. At step 725, the method 700 writes the data to the media 50. The end write is determined at 730. If the write sequence has ended then the method 700 exits at step 735. If the write sequence has not ended, the method 700 returns to step 725 to continue the write.

Figure 8:
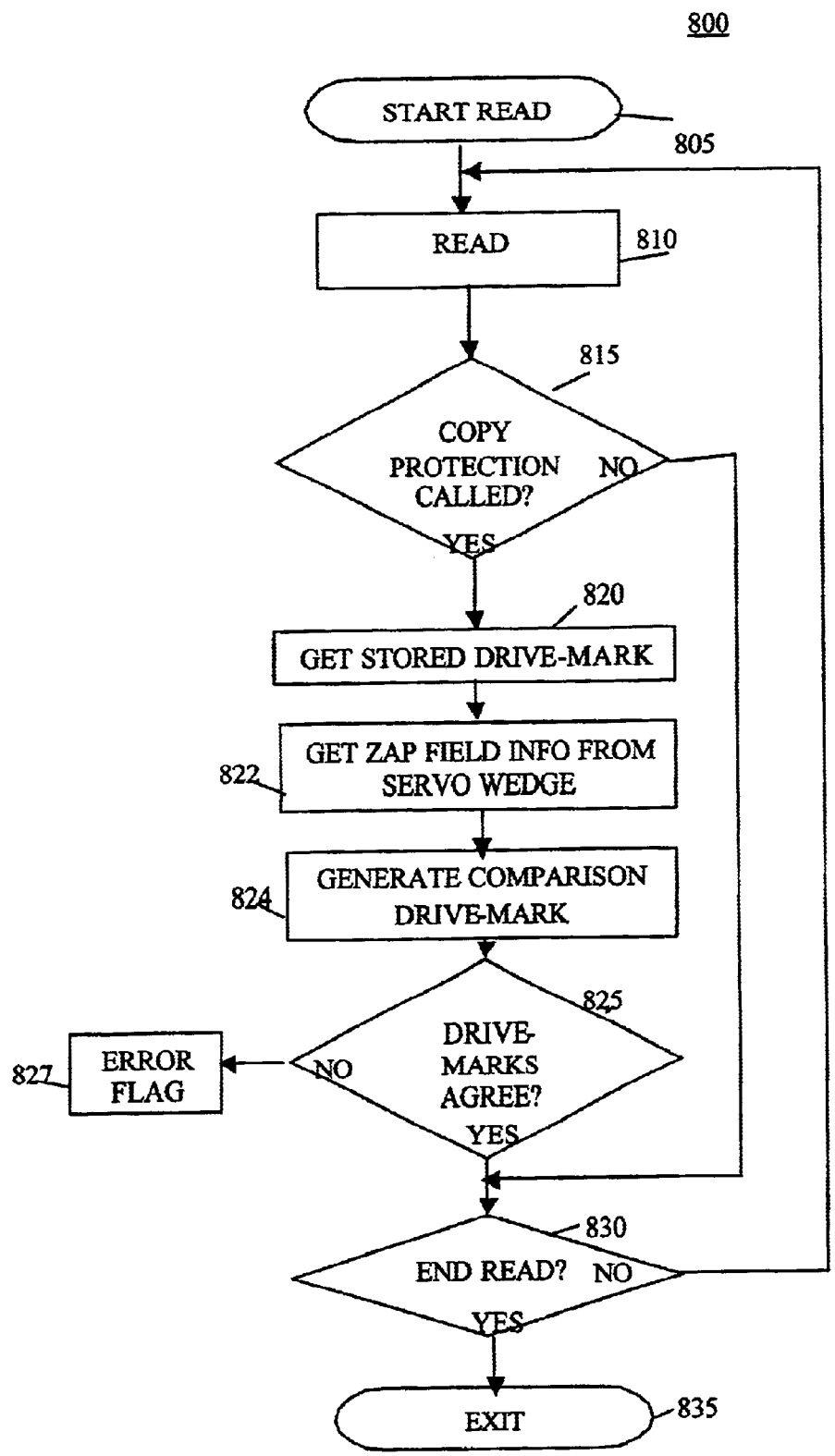
FIG. 8 is a flow diagram of a method of detecting and comparing a drive mark derived from servo wedge data with a stored drive mark in accordance with the present invention.

FIG. 8 is a flow diagram of a method of detecting and comparing a drive mark derived from servo wedge data in accordance with the present invention. As necessary, FIGS. 1–7 are referenced in the following discussion of FIG. 8.

FIG. 8 is entered at step 805 when a read command is received at step 450. At step 810, method 800 converts the logical addresses to physical address using the logical to physical address translation program 345 and then reads the data from the media 50. At step 815, method 800 determines if the copy protection program 325 was called. If the copy protection program 325 was not called then method 800 proceeds to step 830. If the copy protection program 325 was called, at step 820, the stored drive mark is read from the media 50. If the drive mark address is encoded then the ZAP field data Is used by the method 800 to determine the address location of the drive mark and read the drive mark from that address. The ZAP field information is obtained from the servo wedge(s) 220 at step 822. Subsequently the method 800 is used to generate the drive mark of the current drive at step 824. At step 825, the method 800 determines if the stored drive mark is the same as the derived drive mark from step 824. If the drive marks are different, then an error flag is set at step 827. If the drive marks agree then the method 800 proceeds to step 830 to determine if the read has ended. If the read has ended, the method 800 proceeds to step 835 and exits. If the read has not ended then method 800 proceeds to step 810 to continue the read sequence.

Figure 9:
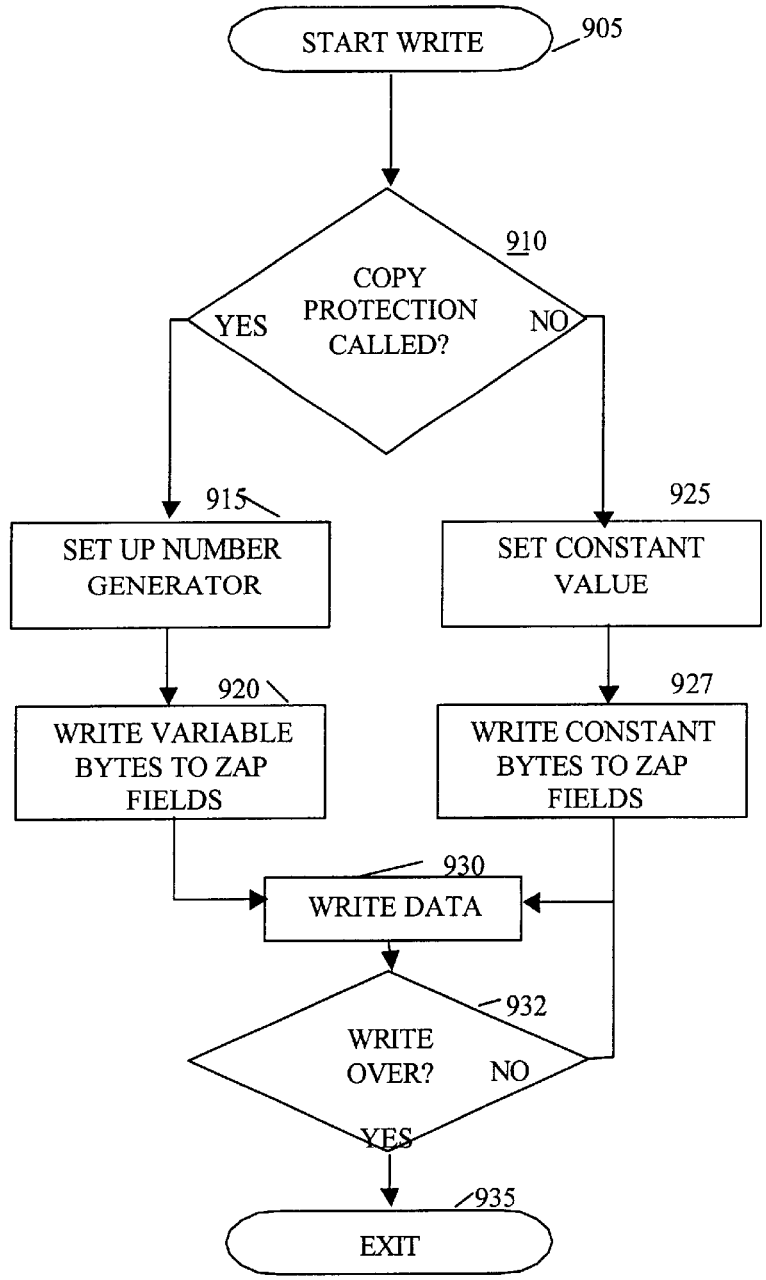
FIG. 9 is a flow diagram of a method of marking a disc drive media using servo wedge data in accordance with the present invention.

FIG. 9 is a flow diagram of a method of marking a disc drive media using servo wedge data in accordance with the present invention. As necessary, FIGS. 1–8 are referenced in the following discussion of FIG. 9.

FIG. 9 is entered at step 905 when a write command is received at step 450. At step 910, the read/write head(s) 40 are positioned by actuator arm 49 in response to interface/disc/servo controller 31 and data is written onto the media 50. At step 910, method 900 determines whether a copy protection command via interface 39 called the copy protection program 325. In one aspect, the set top box 80 issues the copy protection command to the interface/disc/servo controller 31 although the command may be issued from any authorized user of the data. If the command for copy protection was not received and/or not understood, the method 900 proceeds to step 925. If the copy protection program 325 was called, the method 900 proceeds to step

915 and generates at least one variable byte to be placed in the ZAP number fields as the ZAP drive mark. The variable byte is written into the ZAP number field at step 920. At step 925, the method 900 sets a constant byte that can be of any content. For example, the constant byte can be any number, or an alphanumeric byte of data. Ideally, the constant byte is written into at least one byte of the ZAP number field within at least two consecutive servo wedges 220 as part of the ZAP number field data. The constant byte is written into the ZAP number field at step 927. Ideally, the ZAP drive mark(s), i.e., the variable and constant bytes, are part of the ZAP number field stored in ZAP data structure 332 and are appended to the ZAP data to not affect the positioning of the read/write head(s) 40. At step 930, the data is written on the media 50. At step 932, method 900 determines if the write sequence has ended. If the sequence has ended, method 900 exits at step 935. If the write sequence has not ended, then method 900 returns to step 930 and continues the write sequence. In one embodiment, the variable or constant bytes are written to the other positioning indicia with the servo wedge(s).

Figure 10:
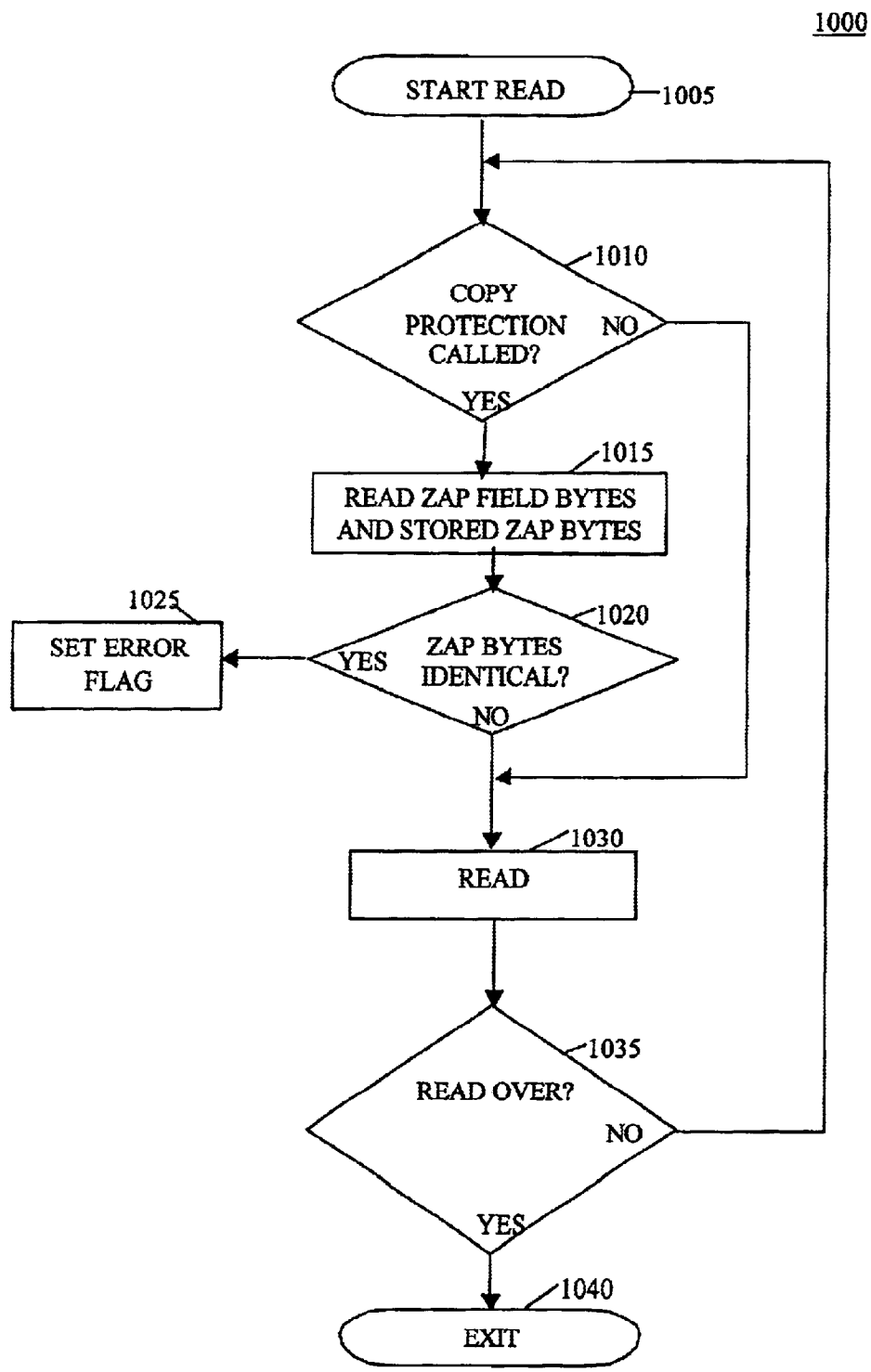
FIG. 10 is a flow diagram of a method of detecting and comparing a drive mark derived from servo wedge data with a stored drive mark in accordance with the present invention.

FIG. 10 is a flow diagram of a method of detecting and comparing servo wedge data with derived data in accordance with the present invention. As necessary, FIGS. 1–9 are referenced in the following discussion of FIG. 10.

FIG. 10 is entered at step 1005 when a read command is received at step 450. At step 1010, method 1000 determines if the copy protection program 325 was called. If the copy protection program 325 was not called then method 1000 proceeds to step 1030. If the copy protection program 325 was called, at step 1015, the ZAP drive mark(s) are read from the ZAP number fields. At step 1020, the method 1000 compares the ZAP drive mark(s) included in the ZAP number field to those ZAP field mark(s) stored in the ZAP field data structure 332 with respect to each servo wedge 220. In one aspect, if two consecutive ZAP drive marks are identical then the method 900 proceeds to step 1025 to set an error flag. In some embodiments, to further minimize the chance of an erroneous error flag being sent form a erroneous read, at least three consecutive ZAP field numbers must contain identical ZAP drive marks before a error flag is set at step 1025. At step 1030, the method 1000 converts the logical addresses to physical address using the logical to physical address translation program 345 and then reads the data. At step 1035, the method 1000 determines if the read is over. The method 900 continues and exists via step 1040 if the read is over. If the read sequence is not over, the method returns to step 1010 to continue the read. In one embodiment, the ZAP mark is read each time a servo wedge is read during the normal read function. Thus, if the copy protection program 325 was called, then at least three identical ZAP drive marks must be read before error is set at step 1025.

Although various embodiments which incorporate the teachings of the present invention have been shown and described in detail herein, those skilled in the art can readily devise many other varied embodiments within the scope of the present invention. For example, it is contemplated that the copy protection program 325 may be integral to the overall drive code, or may be an impendent module within code memory. Alternatively, the copy protection program 325 may be partially stored external to the drive and downloaded through the interface 39. Additionally, if key is used, the key may be provided by the memory and/or loaded from an external source such as set top box 80 or a portion of the key may be stored on the media for later use with the portion of the key stored within the memory. In one embodiment, the copy protection flag may be set to read and write all data as copy protected. Furthermore, the number of times the key and/or copy protection module has been used may also be used as a counter to limit the number of uses. In another embodiment, the positioning indicia and/or the ZAP number field is used for the drive mark. For example, the positioning indicia may be altered or appended to similar to the ZAP number field to provide the drive mark. The resultant drive mark is used identically as with the ZAP number field by comparing a variable byte or constant byte to determine authorization to use or copy data that has been copy protected.

In summary, the invention generally provides a method and apparatus for storing and retrieving copy protected data within storage devices such as a disc drive. In one embodiment, the invention provides a method of writing and reading on a disc drive data to be copy protected including, for a write sequence 500, providing data to be copy protected, then determining 510 if a request to write copy protected data has been issued, if a request to write copy protected data has been issued then providing 515 an encoding element 332, then encoding the data 520 using the encoding element 332, writing 525 the encoded data to the media 50, if the request to write copy protected data has not been issued then writing 525 the data, where for a read sequence 600 determining 615 if a request to read copy protected data has been issued, if the request to read copy protected data has not been issued then reading 610 the data from the media 50, if the request to read copy protected data has been issued then providing a decoding element 617–620, where the decoding element 617–620 is derived from the encoding element 332, and decoding 620 and reading 610 the data wherein the encoding element comprises servo wedge data 332. In one aspect, the encoding element 332 is a zero acceleration profile number field and where the step of encoding 520 the data comprises providing the encoding element to an encoder 328, where the encoder 328 generates randomized data from the encoding element 332.

In another embodiment, the invention provides a method of writing and reading on a disc drive data to be copy protected including for a write sequence 700 providing data to be copy protected, determining 710 if a request to write copy protected data has been issued, and if a request to write copy protected data has been issued then, providing 720 at least a first drive mark 336, storing 722 the first drive mark to a media 50 and writing 725 the data, if the request to write copy protected data has not been issued then writing 725 the data, and for a read 800 sequence, determining 815 if a request to read copy protected data has been issued, if the request to read copy protected data has not been issued then reading 810 the data from the media 50, if the request to read copy protected data has been issued then reading 820 the first drive mark 336, establishing at least one comparison drive mark 824, comparing 825 the first drive mark 336 to the comparison drive mark 824, and reading 810 the data. In one aspect, the first drive mark 336 is a variable byte where if the first drive mark 336 is different from the comparison drive mark 824 then setting a warning flag. In another embodiment, the first drive mark 336 is stored to a reserved area of the media 50, using an encoder 328, the first drive mark 336 is then derived by encoding at least one variable with at least one zero acceleration profile data 332. In another embodiment, where the first drive mark 336 is found identical 1020 to a comparison drive mark 927 then setting a warning flag where the first drive mark 336 is appended to the zero acceleration profile data 332 or where the first drive mark 336 is selected from at least one variable byte 915 or at least one constant byte 925.

In one embodiment, the invention provides a disc drive system including signal-bearing media means 50 for storing data, a code memory means 35 coupled to a read/write controller means 31 for controlling the reading and writing of data to the signal-bearing media 50, means for reading and writing the data to the signal-bearing media 50, a processor means 34 coupled to the code memory 35 and the read/write controller 31 for reading and writing copy protected data on the signal-bearing media means 50. Where the processor means 34 includes a program 325 which, when executed on the processor means 34, is configured to perform the steps, for a write sequence, providing data to be copy protected, determining 510, 710, 910, if a request to write copy protected data has been issued, if a request to write copy protected data has been issued then, providing at least a first drive mark 336, storing the first drive mark 336 to the media 50 then writing the data, if the request to write copy protected data has not been issued then writing 525, 725, 930 the data, whereas for a read sequence, determining 615, 815,1010 if a request to read copy protected data has been issued, if the request to read copy protected data has not been issued then reading 610, 810, 1030, the data from the media 50, if the request to read copy protected data has been issued then reading 820 the first drive mark 336, establishing 824, at least one comparison drive mark 336, comparing the first drive mark 336 to the comparison drive mark 840; and reading 810 the data. In one aspect, where if the first drive mark 336 is different from the comparison drive mark 840 then setting 827 a warning flag, where, using an encoder 328, the first drive mark 336 is derived by encoding 520 at least one variable with at least one zero acceleration profile data 332. In another embodiment, if the first drive mark 336 is identical 1020 to the comparison drive mark 920 then setting 1025 a warning flag, where the first drive mark 336 is appended 920, 927 to the zero acceleration profile data 332. In one aspect, the system includes an encoder means 328 for encoding the data. In another aspect, the system further includes a decoder means 329 for decoding the data. In one aspect, the encoder means 328 comprises at least one encoding element comprising at least one zero acceleration profile data 332.

While foregoing is directed to the preferred embodiment of the present invention, other and further embodiments of the invention may be devised without departing from the basic scope thereof, and the scope thereof is determined by the claims that follow.

We claim:

1. A method of writing and reading on a disc drive data to be copy protected, comprising:

for a write sequence providing data to be copy protected;

determining if a request to write copy protected data has been issued;

if a request to write copy protected data has been issued then;

providing an encoding element;

encoding the data using the encoding element;

writing the encoded data to the media;

if the request to write copy protected data has not been issued then writing the data;

for a read sequence determining if a request to read copy protected data has been issued;

if the request to read copy protected data has not been issued then reading the data from the media;

if the request to read copy protected data has been issued then providing a decoding element, wherein the decoding element is derived from the encoding element; and decoding and reading the data wherein the encoding element comprises servo wedge data.

2. The method of claim 1, wherein the encoding element is a zero acceleration profile number field.

3. The method of claim 1, wherein the step of encoding the data comprises providing the encoding element to an encoder wherein the encoder generates randomized data from the encoding element.

4. The method of claim 1, wherein data wedges on the media are separated by a plurality of servo wedges.

5. The method of claim 1, wherein the servo wedge data is for drive use.

6. The method of claim 5, wherein the servo wedge data is inaccessible to outside users.

7. The method of claim 1, wherein the servo wedge data resides on a servo wedge and identifies a particular track and sector.

8. The method of claim 1, wherein the servo wedge data indicates if a servo wedge is to be skipped.

9. The method of claim 1, wherein a drive is marked by a number generated from the servo wedge data.

10. A method of writing and reading on a disc drive data to be copy protected, comprising:

for a write sequence;

providing data to be copy protected;

determining if a request to write copy protected data has been issued;

if a request to write copy protected data has been issued then;

providing at least a first drive mark;

storing the first drive mark to a media and writing the data;

if the request to write copy protected data has not been issued then writing the data;

for a read sequence;

determining if a request to read copy protected data has been issued;

if the request to read copy protected data has not been issued then reading the data from the media;

if the request to read copy protected data has been issued then reading the first drive mark;

establishing at least one comparison drive mark;

comparing the first drive mark to the comparison drive mark; and reading the data.

11. The method of claim 10, wherein the first drive mark is a variable byte.

12. The method of claim 10, wherein if the first drive mark is different from the comparison drive mark then setting a warning flag.

13. The method of claim 10, wherein the first drive mark is stored to a reserved rea of the media.

14. The method of claim 13, wherein, using an encoder, the first drive mark is generated by encoding at least one variable with at least one zero acceleration profile data.

15. The method of claim 10, wherein if the first drive mark is identical to the comparison drive mark then setting a warning flag.

16. The method of claim 15, wherein the first drive mark is appended to the zero acceleration profile data.

17. The method of claim 15, wherein the first drive mark is selected from at least one variable byte or at least one constant byte.

18. A data storage system comprising:

a signal-bearing media means for storing data;

a code memory means coupled to a read/write controller means for controlling
the reading and writing of data to the signal-bearing media,
　means for reading and writing the data to the signal-bearing media;
　a processor means coupled to the code memory and the read/write controller for reading and writing copy protected data on the signal-bearing media means, wherein the processor means comprises a program which, when executed on the processor means, is configured to perform the steps comprising:
　　for a write sequence providing data to be copy protected;
　　determining if a request to write copy protected data has been issued;
if a request to write copy protected data has been issued then;
　providing at least a first drive mark;
　storing the first drive mark to the media then writing the data;
if the request to write copy protected data has not been issued then writing the data;
　for a read sequence determining if a request to read copy protected data has been issued;
if the request to read copy protected data has not been issued then reading the data from the media;
if the request to read copy protected data has been issued then
　reading the first drive mark;
　establishing at least one comparison drive mark;
　comparing the first drive mark to the comparison drive mark; and
　reading the data.

19. The system of claim 18, wherein if the first drive mark is different from the comparison drive mark then setting a warning flag.

20. The system of claim 18, wherein, using an encoder, the first drive mark is derived by encoding at least one variable with at least one zero acceleration profile data.

21. The system of claim 18, wherein if the first drive mark is identical to the comparison drive mark then setting a warning flag.

22. The system of claim 21, wherein the first drive mark is appended to the zero acceleration profile data.

23. The system of claim 18, further comprising an encoder means for encoding the data.

24. The system of claim 23, further comprising a decoder means for decoding the data.

25. The system of claim 23, wherein the encoder means comprises at least one encoding element comprising at least one zero acceleration profile data.

* * * * *